US012645097B2

(12) United States Patent (10) Patent No.: US 12,645,097 B2
Gacoin et al. (45) Date of Patent: Jun. 2, 2026

(54) OPTICAL LENS

(71) Applicant: Essilor International, Charenton-le-Pont (FR)

(72) Inventors: Eric Gacoin, Charenton-le-Pont (FR); Matthieu Guillot, Charenton-le-Pont (FR); Bruno Fermigier, Charenton-le-Pont (FR); Gilles Le Saux, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 615 days.

(21) Appl. No.: 18/001,102

(22) PCT Filed: May 28, 2021

(86) PCT No.: PCT/EP2021/064437
§ 371 (c)(1),
(2) Date: Dec. 8, 2022

(87) PCT Pub. No.: WO2021/249796
PCT Pub. Date: Dec. 16, 2021

(65) Prior Publication Data
US 2023/0213784 A1 Jul. 6, 2023

(30) Foreign Application Priority Data

Jun. 12, 2020 (EP) ..................................... 20305650

(51) Int. Cl.
*G02C 7/02* (2006.01)

(52) U.S. Cl.
CPC ................................... *G02C 7/022* (2013.01)

(58) Field of Classification Search
CPC ...... G02C 7/022; G02C 2202/24; G02C 7/02; G02C 7/021; G02C 7/04; G02C 7/10;
(Continued)

(56) References Cited

U.S. PATENT DOCUMENTS 7,637,612 B2 12/2009 Menezes
8,672,473 B2 3/2014 Martinez et al.
(Continued)

FOREIGN PATENT DOCUMENTS

CN 104160321 A 11/2014
EP 2 762 953 A1 8/2014
(Continued)

OTHER PUBLICATIONS

Office Action issued Dec. 2, 2024, in corresponding Japanese Patent Application No. 2022-576509 (with English Translation), 12 pages.
(Continued)

*Primary Examiner* — Matthew Y Lee
(74) *Attorney, Agent, or Firm* — Oblon, McClelland, Maier & Neustadt, L.L.P.

(57) ABSTRACT

An optical lens to be worn in front of an eye of a wearer having at least one prescribed refractive power Px, the optical lens including two opposite optical faces and a plurality of contiguous optical elements at least part of the optical elements having an optical function of not focusing an image on the retina of the eye of the wearer so as to slow down the progression of the abnormal refraction of the eye. Over a pupil having at least a 4 mm diameter, one can measure in a plane corresponding to the at least one pre-scribed refractive power along at least one direction, a Modulation Transfer Function through the optical lens greater than 0.1 between 0 and 20 cyc/deg.

12 Claims, 5 Drawing Sheets

(58) Field of Classification Search
CPC .......... G02C 7/16; G02C 7/027; G02C 7/061;
B29D 11/00326; B29D 11/00528; B29D
11/00336; B29D 11/00009; A61B 3/1005
See application file for complete search history.

(56) References Cited

U.S. PATENT DOCUMENTS

| | | | |
|---|---|---|---|
| 8,684,520 | B2 | 4/2014 | Lindacher et al. |
| 8,690,319 | B2 | 4/2014 | Menezes |
| 2014/0211147 | A1 | 7/2014 | Wei et al. |
| 2015/0092157 | A1 | 4/2015 | Tessieres et al. |
| 2018/0275427 | A1* | 9/2018 | Lau ........................ G02C 7/081 |
| 2019/0235279 | A1* | 8/2019 | Hones ...................... G02C 7/10 |
| 2020/0073147 | A1* | 3/2020 | Bakaraju ................ G02C 7/022 |
| 2020/0132441 | A1 | 4/2020 | Uchidani et al. |
| 2020/0326559 | A1* | 10/2020 | Hoshi ................... B29C 33/424 |
| 2021/0286195 | A1* | 9/2021 | Matsuoka .............. G02C 7/022 |
| 2022/0035179 | A1* | 2/2022 | Rappon .................. G02C 7/061 |
| 2022/0107508 | A1* | 4/2022 | Zhou ........................ G02C 7/06 |
| 2022/0146857 | A1* | 5/2022 | Hones, Jr. ........ B29D 11/00326 |
| 2023/0004026 | A1* | 1/2023 | Bakaraju .................. G02C 7/10 |
| 2023/0176399 | A1* | 6/2023 | Bakaraju .................. G02C 9/00 |
| | | | 351/159.69 |

FOREIGN PATENT DOCUMENTS

| | | |
|---|---|---|
| EP | 3 561 578 A1 | 10/2019 |
| EP | 3 640 714 A1 | 4/2020 |
| JP | 2011-502011 A | 1/2011 |
| JP | 2019-211772 A | 12/2019 |
| WO | WO 2009/058755 A1 | 5/2009 |
| WO | WO 2011/129060 A1 | 10/2011 |
| WO | WO 2013/149303 A1 | 10/2013 |
| WO | WO 2014/059465 A1 | 4/2014 |
| WO | WO 2019/124352 A1 | 6/2019 |
| WO | WO 2019/166659 A1 | 9/2019 |
| WO | WO 2020/031321 A1 | 2/2020 |
| WO | WO 2020/079105 A1 | 4/2020 |
| WO | WO 2020/113212 A1 | 6/2020 |

OTHER PUBLICATIONS

Combined Chinese Office Action and Search Report issued Jan. 21, 2025, in corresponding Chinese Patent Application No. 202180041759.2 (with English Translation), 21 pages.
International Search Report and Written Opinion issued Jul. 28, 2021, in PCT/EP2021/064437, filed on May 28, 2021, 14 pages.

* cited by examiner

OPTICAL LENS

TECHNICAL FIELD

The disclosure relates to an optical lens intended to be worn in front of an eye of a wearer having at least one prescribed refractive power Px, the optical lens comprising two opposite optical faces and a plurality of contiguous optical elements.

The disclosure further relates to a mold for a lens element intended to be worn in front of an eye of a person.

BACKGROUND OF THE DISCLOSURE

Myopia of an eye is characterized by the fact that the eye focuses distant objects in front of its retina. Myopia is usually corrected using a concave lens and hyperopia is usually corrected using a convex lens.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time.

Foveal vision corresponds to viewing conditions for which the image of an object looked at is formed by the eye in the central zone of the retina, called the foveal zone.

Peripheral vision corresponds to the perception of elements of a scene that are offset laterally relative to the object looked at, the images of said elements being formed on the peripheral portion of the retina, away from the foveal zone.

The ophthalmic correction with which an ametropic subject is provided is usually adapted for his foveal vision. However, as is known, the correction has to be reduced for the peripheral vision relative to the correction that is determined for the foveal vision. In particular, studies carried out on monkeys have shown that strong defocusing of the light behind the retina, which occurs away from the foveal zone, may cause the eye to elongate and therefore may cause a myopia defect to increase.

Therefore, it appears that there is a need for a lens element that would suppress or at least slow down progression of abnormal refractions of the eye such as myopia or hyperopia.

SUMMARY OF THE DISCLOSURE

To this end, the disclosure proposes an optical lens intended to be worn in front of an eye of a wearer having at least one prescribed refractive power Px, the optical lens comprising two opposite optical faces and a plurality of contiguous optical elements at least part of the optical elements having an optical function of not focusing an image on the retina of the eye of the wearer so as to slow down the progression of the abnormal refraction of the eye, wherein:

over a pupil having at least a 4 mm diameter, one can measure in a plane corresponding to the at least one prescribed refractive power along at least one direction, a Modulation Transfer Function through the optical lens greater than 0.1 between 0 and 20 cyc/deg;

a majority of the light rays passing through the optical lens over said pupil pass through at least one of the plurality of optical elements, and each of the contiguous optical element verifies that $$d = \frac{K}{\ }\sqrt{|P|},$$

with d a characteristic dimension of the contour of said optical element in mm,

|P| the absolute value of a characteristic optical power of said optical element expressed in diopter, and K a number greater or equal to 0.9 and smaller than or equal to 1.7.

Advantageously, having optical elements that verify the specific relation between their dimensions and optical powers allows having contiguous optical elements covering a majority of part of the surface of the optical lens while providing the prescribed refractive power to the wearer when wearing the optical lens.

Advantageously, the optical lens according to the disclosure allows to slow down the progression of the abnormal refraction of the eye using the contiguous optical elements while providing the prescribed refractive power to the wearer.

According to further embodiments which can be considered alone or in combination:

over the said pupil the optical lens produces a first optical path difference OPD1, a best spherical fitting optical lens produces a second optical path difference OPD2, a differential optical path map DOP being composed as the difference between said first optical path difference OPD1 and said second optical path difference OPD2, the differential optical path DOP being different than zero; and/or the optical elements are contiguous over said pupil when the portion of said differential optical path DOP within the range [minimum level of DOP, minimum level of DOP+10% of the amplitude] represents less than 30% of said differential optical path (DOP) over said pupil, for example at least 20%, for example at least 10%, for example at least 5%; with the amplitude the maximum level of said differential optical path (DOP) over said pupil; and/or the characteristic dimension of each optical element corresponds to the largest diameter of the inscribed circle in a contour plot defined by a level of said differential optical path (DOP), said level being constant over said pupil and within the range [minimum level of DOP, minimum level of DOP+10% of the amplitude], with the amplitude the maximum level of said differential optical path (DOP) over said pupil; and/or at least part of, for example all of, the optical elements have a characteristic optical power smaller than or equal to 20 D, for example smaller than or equal to 10 D, for example smaller than or equal to 6 D; and/or the pupil of 5 mm of diameter comprises a reference point of the optical lens, for example the fitting cross or the optical center; and/or the optical elements are positioned on a structured mesh being a squared mesh or a hexagonal mesh or a triangle mesh or an octagonal mesh or a random mesh; and/or at least one, for example all, of the optical element has an optical function of focusing an image on a position other than the retina in standard wearing conditions; and/or at least 50%, for example all, of the optical elements have an optical axis and the optical axis of said optical elements intersect at a single point; and/or at least 50%, for example all, of the optical elements have at least one focal point, and the at least one focal point of each said optical elements coincide; and/or at least 50%, for example all, of the optical elements are configured to focus an image on a common position; and/or at least one, for example all, of the optical element has an optical function of not focusing an image on in standard wearing conditions; and/or at least 50%, for example at least 80%, of the light rays passing through the optical lens over said pupil pass through at least one of the plurality of optical elements; and/or at least part of, for example all of, the optical elements are located on the front surface of the optical lens; and/or at least part of, for example all of, the optical elements are located on the back surface of the optical lens; and/or at least part of, for example all of, the optical elements are located between the front and back surfaces of the optical lens; and/or at least part, for example all, of the optical elements have an annular shape, for example around a refraction area; and/or the optical elements have a contour shape being inscribable in a circle having a diameter greater than or equal to 0.2 mm, for example greater than or equal to 0.4, for example greater than or equal to 0.6, and smaller than or equal to 2.0 mm, for example smaller than 1.0 mm; and/or the optical elements are positioned along a plurality of concentric rings; and/or the optical elements are positioned on a structured mesh; and/or the mesh structure is a random mesh, for example a Voronoi mesh; and/or the optical elements are configured so that the mean focus of the light rays passing through each optical element is at a same distance to the retina, with a tolerance smaller than or equal to 2 mm, preferably smaller than or equal to 1 mm); and/or at least one, for example all, of the optical element has a non-spherical optical function in standard wearing conditions; and/or at least one, for example all, of the optical elements has a cylindrical power and/or at least part, for example all, of the optical elements have a constant optical power and a discontinuous first derivative between two contiguous optical elements; and/or at least part, for example all, of the optical elements have a varying optical power and a power sign change between two contiguous optical elements; and/or the optical elements are configured so that along at least one section of the lens the mean sphere of optical elements varies from a point of said section towards the peripheral part of said section; and/or the optical elements are configured so that along at least one section of the lens the cylinder of optical elements varies from a point of said section towards the peripheral part of said section; and/or the optical elements are configured so that along the at least one section of the lens the mean sphere and/or the cylinder of optical elements varies from the center of said section towards the peripheral part of said section, for example increases then decreases, for example decreases, for example increases; and/or the optical lens comprises a refraction area free of optical elements and having an optical function corresponding the prescribed optical power Px; and/or the optical lens is fully covered by optical elements and having a Modulation Transfer Function value at 20 cy/degree, in a plane corresponding to the at least one prescribed refractive power along at least one direction, greater on the central zone than on a peripheral zone of the lens; and/or the refractive area is formed as the area other than the areas formed as the plurality of optical elements; and/or the refraction area comprises an optical center and the optical elements are configured so that along any section passing through the optical center of the lens the mean sphere and/or the cylinder of the optical elements varies from the optical center towards the peripheral part of the lens, for example increases then decreases, for example decreases, for example increases; and/or the refraction area comprises a far vision reference point, a near vision reference, and a meridian joining the far and near vision reference points, the optical elements are configured so that in standard wearing conditions along any horizontal section of the lens the mean sphere and/or the cylinder of the optical elements varies from the intersection of said horizontal section with the meridian towards the peripheral part of the lens, for example increases then decreases, for example decreases, for example increases; and/or the mean sphere and/or the cylinder increase function along the sections are different depending on the position of said section along the meridian; and/or the mean sphere and/or the cylinder increase function along the sections are unsymmetrical; and/or the optical elements are configured so that in standard wearing condition the at least one section is a horizontal section; and/or the mean sphere and/or the cylinder of optical elements varies, for example increases, from a first point of said section towards the peripheral part of said section and varies, for example decreases, from a second point of said section towards the peripheral part of said section, the second point being closer to the peripheral part of said section than the first point; and/or the mean sphere and/or the cylinder increase function along the at least one section is a Gaussian function; and/or the mean sphere and/or the cylinder increase function along the at least one section is a Quadratic function; and/or the mean sphere of at least part, for example all, of the optical elements varies, for example increases or decreases, within said optical element with eccentricity; and/or the optical elements are organized in at least two groups of contiguous optical elements; and/or each group of contiguous optical element is organized in at least two concentric rings having the same center, the concentric ring of each group of contiguous optical element being defined by an inner diameter corresponding to the smallest circle that is tangent to at least one optical element of said group and an outer diameter corresponding to the largest circle that is tangent to at least one optical elements of said group;

at least part of, for example all, the concentric rings of optical elements are centered on the optical center of the surface of the lens element on which said optical elements are disposed; and/or the concentric rings of optical elements have a diameter comprised between 9.0 mm and 60 mm; and/or the optical element further comprises optical elements positioned radially between two concentric rings; and/or at least one of the optical elements is a multifocal refractive micro-lens; and/or the at least one multifocal refraction micro-lens comprises a cylindrical power; and/or the at least one multifocal refractive micro-lens comprises an aspherical surface, with or without any rotational symmetry; and/or at least one of the optical elements is a toric refractive micro-lens; and/or the at least one multifocal refractive micro-lens comprises a toric surface.

The disclosure further relates to a molding element adapted for molding an optical lens according to the disclosure.

For example, the disclosure relates to a molding element for a lens element comprising a plurality of contiguous optical elements, comprising a main surface having a curvature and comprising a plurality contiguous surfacic elements, each surfacic element having a curvature that differs from the curvature of the main surface, wherein over at least a 4 mm diameter disc:

the contiguous surfacic elements cover most of the main surface, and each of the contiguous surfacic elements verifies that $$d = \frac{L}{\sqrt{|C|}},$$

with d a characteristic dimension of the contour of said surfacic element in mm,

|C| the absolute value of a characteristic curvature of said surfacic element expressed in diopter, and L a number greater or equal to 1 and smaller than or equal to 7.6.

BRIEF DESCRIPTION OF THE DRAWINGS

Non-limiting embodiments of the disclosure will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DETAILED DESCRIPTION OF EMBODIMENTS OF THE DISCLOSURE

The disclosure relates to an optical lens intended to be worn in front of an eye of a wearer.

In the description, terms like «up», «bottom», «horizontal», «vertical», «above», «below», «front», «rear» or other words indicating relative position may be used. These terms are to be understood in the wearing conditions of the lens element.

In the context of the present disclosure, the term "optical lens" can refer to an uncut optical lens or a spectacle optical lens edged to fit a specific spectacle frame or an ophthalmic lens and an optical device adapted to be positioned on the ophthalmic lens. The optical device may be positioned on the front or back surface of the ophthalmic lens. The optical device may be an optical patch. The optical device may be adapted to be removably positioned on the ophthalmic lens for example a clip configured to be clipped on a spectacle frame comprising the ophthalmic lens.

An optical lens according to the disclosure is adapted for a wearer and intended to be worn in front of an eye of said wearer.

Figure 1:
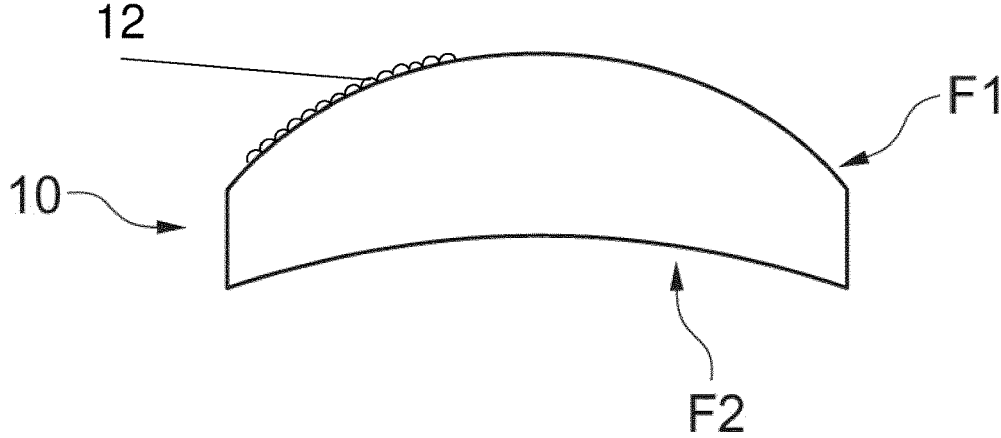
FIG. 1 is a general profile view of an optical lens according to an embodiment of the disclosure.

As represented on FIG. 1, an optical lens 10 according to the disclosure comprises two opposite optical faces F1 and F2 and a plurality of contiguous optical elements 12.

A lens element 10 according to the disclosure as represented on FIG. 1, comprises an object side surface F1 formed as a convex curved surface on FIG. 1 toward an object side, and an eye side surface F2 formed as a concave surface on FIG. 1 having a different curvature than the curvature of the object side surface F1.

According to an embodiment of the disclosure, at least part, for example all, of the optical elements are located on the front surface of the lens element.

At least part, for example all, of the optical elements may be located on the back surface of the lens element.

At least part, for example all, of the optical elements may be located between the front and back surfaces of the lens element. For example, the lens element may comprise zones of different refractive index forming the optical elements.

The optical lens according to the disclosure is intended to be worn in front of an eye of a wearer having a least a prescribed refractive power Px. The prescribed optical power may correspond to a spherical and/or cylindrical optical power.

At least part, for example all, of the optical element 12 of the optical lens 10 has an optical function of not focusing an image on the retina of the eye of the wearer so as to slow down the progression of the abnormal refraction of the eye.

Preferably, at least 50%, for example at least 80%, for example all, of the optical elements have an optical function of not focusing an image on the retina of the eye of the wearer so as to slow down the progression of the abnormal refraction of the eye.

In the sense of the disclosure "focusing" is to be understood as producing a focusing spot with a circular section that can be reduced to a point in the focal plane or the size of the diffraction spot.

Advantageously, such optical function of the optical element reduces the deformation of the retina of the eye of the wearer in peripheral vision, allowing to slow down the progression of the abnormal refraction of the eye of the person wearing the lens element.

According to an embodiment of the disclosure, at least part, for example all, of the optical elements has an optical function of focusing an image on a position other than the retina.

Preferably, at least 50%, for example at least 80%, for example all, of the optical elements have an optical function of focusing an image on a position other than the retina.

According to a preferred embodiment of the disclosure, all of the optical elements are configured so that the mean focus of the light rays passing through each optical element is at a same distance to the retina of the wearer, at least for peripheral vision.

Figure 2:
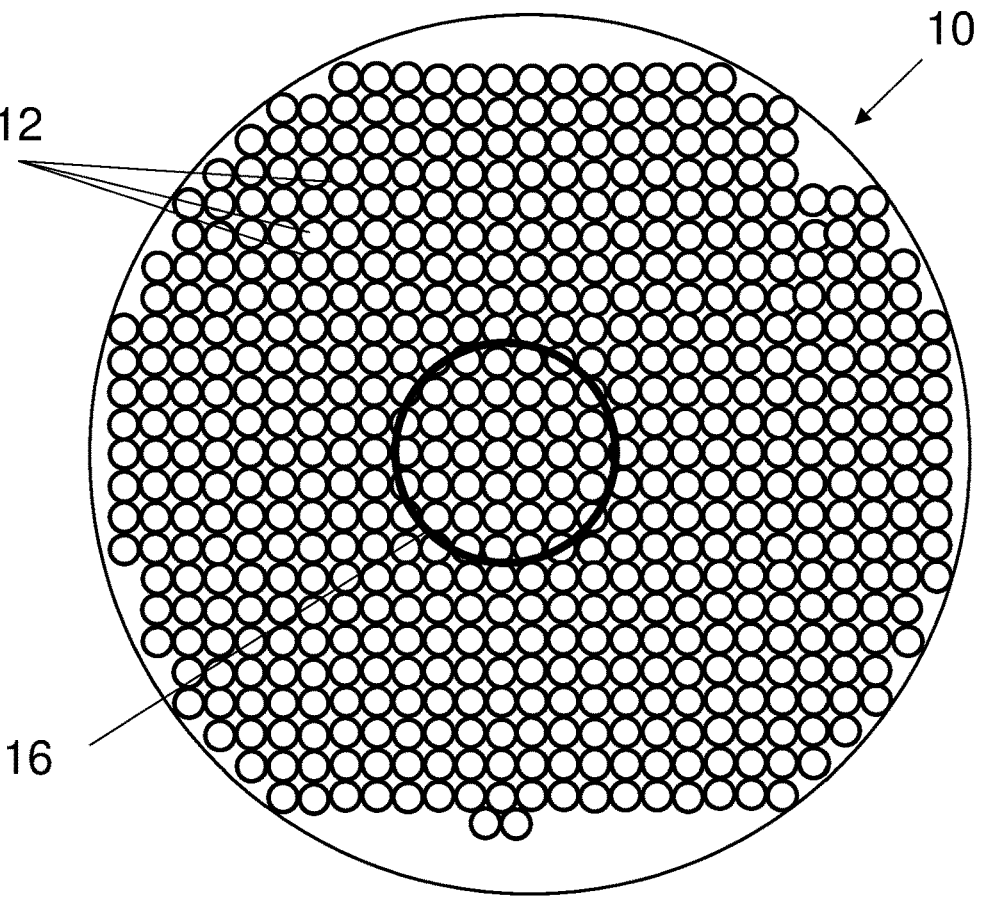
FIG. 2 is a plan view of an optical lens according to an embodiment of the disclosure.

As illustrated on FIG. 2, the plurality of contiguous optical element comprises a plurality of independent contiguous optical elements 12.

In the sense of the disclosure, two optical elements are considered as independent if producing independent images.

In particular, when illuminated by a parallel beam "in central vision", each "independent contiguous optical element" forms on a plane in the image space a spot associated with it. In other words, when one of the "optical element" is hidden, the spot disappears even if this optical element is contiguous with another optical element.

According to embodiments of the disclosure, the optical elements are positioned on a mesh.

Figure 3A:
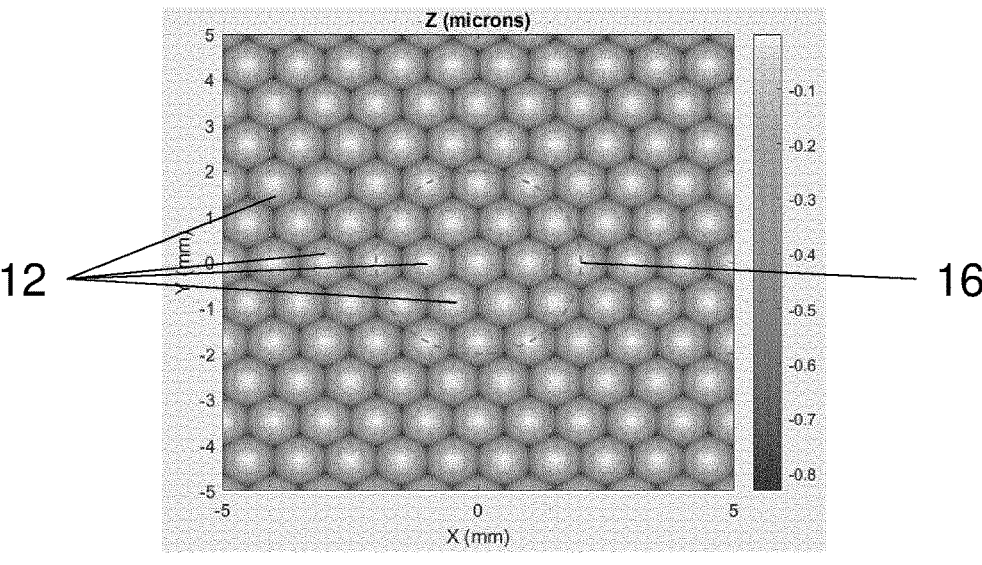
FIGS. 3a to 3c illustrate example of position of optical elements according to the disclosure.
Figure 3B:
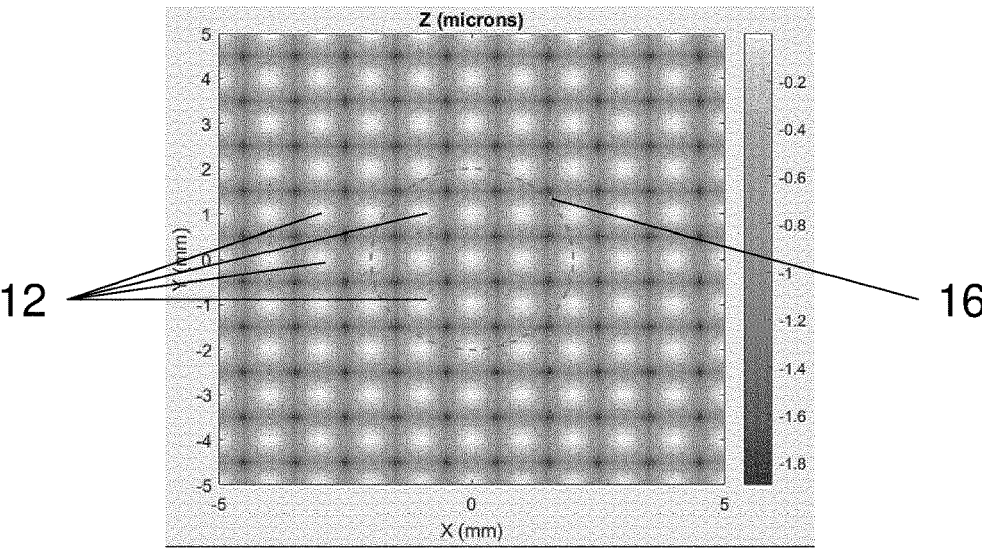
Figure 3C:
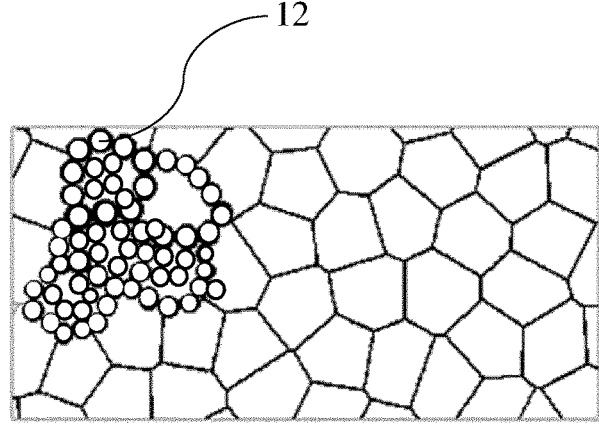

Although not represented accurately on FIG. 2, the mesh on which the optical elements are positioned may be a structured as illustrated on FIGS. 3a and 3c.

According to an embodiment of the disclosure and the optical elements may positioned on a structured mesh, such as a squared mesh or a hexagonal mesh or a triangle mesh or an octagonal mesh or a random mesh.

FIG. 3a illustrates optical elements positioned according to a hexagonal mesh.

FIG. 3b illustrates optical elements positioned according to squared mesh.

The optical elements may also be positioned along a plurality of concentric rings.

The concentric rings of optical elements may be annular rings.

According to an embodiment of the disclosure, the lens element comprises optical elements disposed in at least 2 concentric rings, preferably more than 5, more preferably more than 10 concentric rings. For example, the optical elements may be disposed in 11 concentric rings centered on the optical center of the lens.

Alternatively, the optical elements may be placed on a random structure mesh such as a Voronoi mesh as illustrated on FIG. 3c.

Advantageously, having the optical elements placed on a random structure limits the risk of light scattering or diffraction.

The wearing conditions are to be understood as the position of the optical lens with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens, for example, equal to 12 mm.

The Pupil-cornea distance is the distance along the visual axis of the eye between its pupil and cornea, usually equal to 2 mm.

The CRE to pupil distance is the distance along the visual axis of the eye between its center of rotation (CRE) and cornea, for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

Although the disclosure is not directed to progressive lenses, the wording used in this description is illustrated in FIGS. 1 to 10 of document WO2016/146590 for a progressive lens. The skilled person can adapt the definitions for single vision lenses.

The optical lens or the optical element may comprises a non-rotationally symmetrical aspheric surface, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in diopters.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in diopters.

It can be noticed that when the surface is locally spherical, the local minimum radius of curvature $R_{min}$ and the local maximum radius of curvature $R_{max}$ are the same and, accordingly, the minimum and maximum curvatures CUR- $V_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labelled $SPH_{min}$ and $SPH_{max}$ can be deduced according to the kind of surface considered.

When the surface considered is the object side surface (also referred to as the front surface), the expressions are the following:

$$SPH_{min} = (n-1) * CURV_{min} = \frac{n-1}{R_{max}},$$

$$\text{and } SPH_{min} = (n-1) * CURV_{min} = \frac{n-1}{R_{max}}$$

where n is the index of the constituent material of the lens.

If the surface considered is an eyeball side surface (also referred to as the back surface), the expressions are the following:

$$SPH_{min} =$$

$$(1-n) * CURV_{min} = \frac{1-n}{R_{max}} \text{ and } SPH_{max} = (1-n) * CURV_{max} = \frac{1-n}{R_{min}}$$

where n is the index of the constituent material of the lens.

As is well known, a mean sphere SPHmean at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

a cylinder CYL is also defined by the formula $CYL = |SPH_{max} - SPH_{min}|$.

The characteristics of any aspherical face of the lens may be expressed by the local mean spheres and cylinders. A surface can be considered as locally non-spherical when the cylinder is at least 0.25 diopter.

Figure 4:
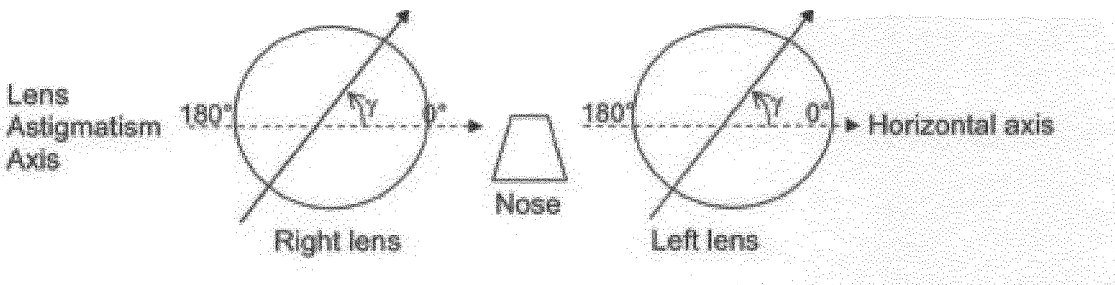
FIG. 4 illustrates the astigmatism axis γ of a lens in the TABO convention.
Figure 5:
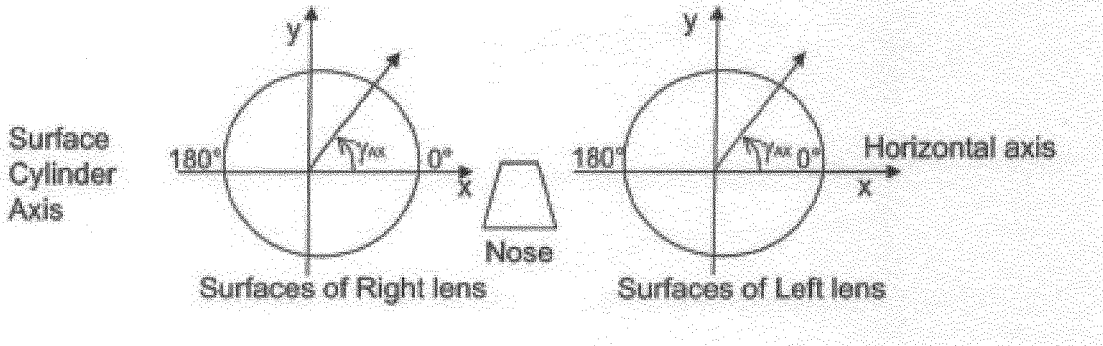
FIG. 5 illustrates the cylinder axis $\gamma_{AX}$ in a convention used to characterize an aspherical surface.

For an aspherical surface, a local cylinder axis γAX may further be defined. FIG. 4 illustrates the astigmatism axis γ as defined in the TABO convention and FIG. 5 illustrates the cylinder axis γAX in a convention defined to characterize an aspherical surface.

The cylinder axis γAX is the angle of the orientation of the maximum curvature CURVmax with relation to a reference axis and in the chosen sense of rotation. In the above defined convention, the reference axis is horizontal (the angle of this reference axis is 0°) and the sense of rotation is counter-clockwise for each eye, when looking at the wearer (0°≤γAX≤180°). An axis value for the cylinder axis γAX of +45° therefore represents an axis oriented obliquely, which when looking at the wearer, extends from the quadrant located up on the right to the quadrant located down on the left.

Moreover, a progressive multifocal lens may also be defined by optical characteristics, taking into consideration the situation of the person wearing the lenses.

Figure 6:
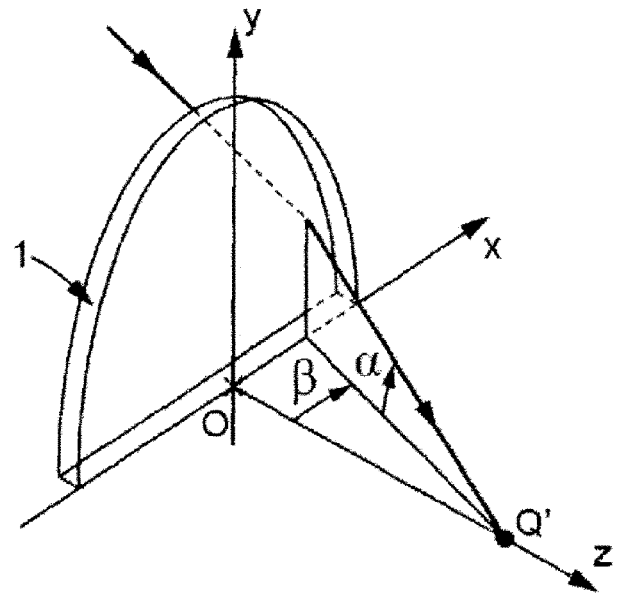
FIGS. 6 and 7 show, diagrammatically, optical systems of eye and lens.
Figure 7:
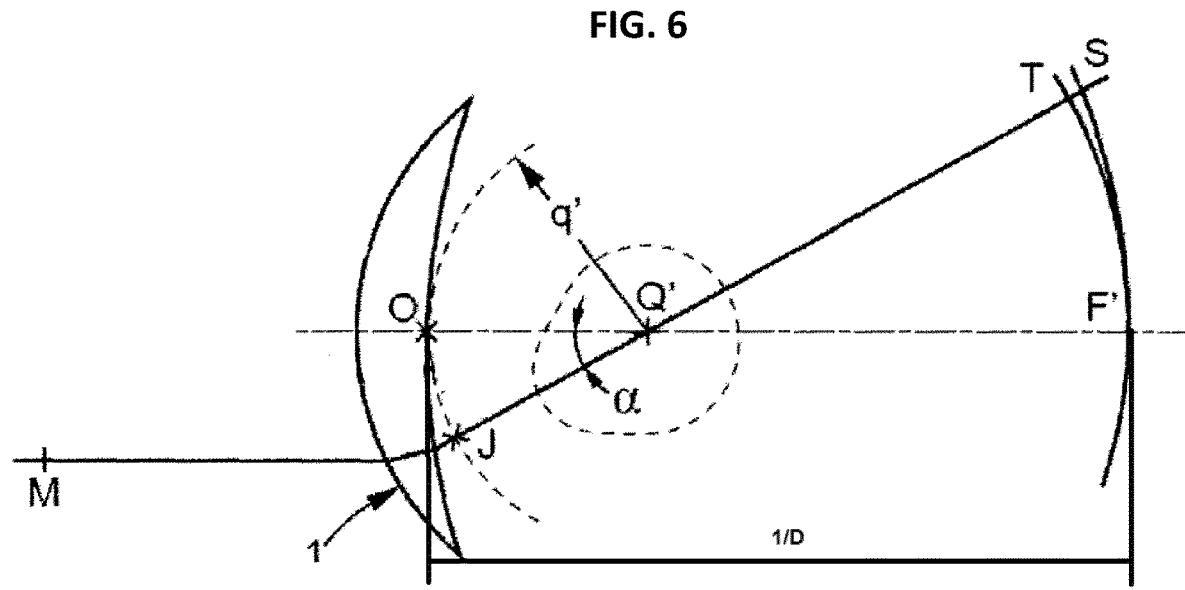

FIGS. 6 and 7 are diagrammatic illustrations of optical systems of eye and lens, thus showing the definitions used in the description. More precisely, FIG. 6 represents a perspective view of such a system illustrating parameters α and β used to define a gaze direction. FIG. 7 is a view in the vertical plane parallel to the antero-posterior axis of the wearer's head and passing through the center of rotation of the eye in the case when the parameter β is equal to 0.

The center of rotation of the eye is labelled Q'. The axis Q'F', shown on FIG. 8 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 6—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 6. The angle α is the angle formed between the axis Q'J and the projection of the straight line Q'J on the horizontal plane comprising the axis Q'F'; this angle appears on the scheme on FIGS. 6 and 7. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its mod-elling method. For a method of the disclosure, points may be at infinity or not. Ergorama may be a function of the wearer's ametropia or wearer's addition.

Using these elements, it is possible to define a wearer optical power and astigmatism, in each gaze direction. An object point M at an object distance given by the ergorama is considered for a gaze direction $(\alpha,\beta)$. An object proximity ProxO is defined for the point M on the corresponding light ray in the object space as the inverse of the distance MJ between point M and point J of the apex sphere:

$$ProxO = \frac{1}{MJ}$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction $(\alpha,\beta)$, the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle $\gamma$. The angle $\gamma$ is measured in the frame {Q', xm, ym, zm} linked to the eye. It corresponds to the angle with which the image S or T i formed depending on the convention used with relation to the direction zm in the plane {Q', zm, ym}.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

As illustrated on FIG. 2, one may define a pupil 16 having a diameter of at least 4 mm, for example 10 mm, over which one can measure in a plane corresponding to the at least one prescribed refractive power along at least one direction, a Modulation Transfer Function through the optical lens greater than 0.1, for example greater than or equal to 0.2, between 0 and 20 cyc/deg.

The density of the contiguous optical elements is such that over said pupil 16 a majority, for example at least 50% or at least 80%, of the light rays passing through the optical lens over said pupil 16 pass through at least one of the plurality of optical elements.

In the sense of the present disclosure, a light ray is considered passing through an optical element if passing through the largest inscribed circle of the optical element corresponding to a a contour plot defined by a level of said differential optical path (DOP), said level being constant over said pupil and within the range [minimum level of DOP, minimum level of DOP+10% of the amplitude], with the amplitude the maximum level of said differential optical path (DOP) over said pupil.

Over the pupil 16, the optical lens 10 produces a first optical path difference OPD1. An optical path is the product of the geometric length of the path followed by light through an optical system, and the index of refraction of said optical system. A difference in optical path length between two paths is called the optical path difference OPD. In the sense of the disclosure the first optical path difference is the difference in optical path length between light rays passing through the optical lens and light ray passing through air. In the sense of the present disclosure the following convention is applied: for spherical lens with positive optical power, the OPD is higher in its center than at the edge.

The OPD can be considered and measured as a surface in 3D space and written (x, y, f(x,y)). The best sphere is the sphere whose parameters, its centre and its radius, are optimized, as disclosed in chapter 6 of document http://www.sci.utah.edu/~balling/FEtools/doc_files/Least-SquaresFitting.pdf For the optimizing process, the cost function can be defined by the sum, for example over all the points of the square of the difference between each point and the sphere. This distance can be defined in at least 2 different ways Z difference distance in the normal direction (as in the previous paper).

One may determine a second optical path difference OPD2 corresponding the best spherical fitting optical lens.

A differential optical path DOP being composed as the difference between said first optical path difference OPD1 and said second optical path difference OPD2 may be determined. The differential optical path DOP of an optical lens according to the disclosure is different than zero over the pupil. In other words the first optical path difference OPD1 does not match an optical path difference of an spherical optical lens.

The optical elements are contiguous over said pupil when the portion of said differential optical path DOP within the range [minimum level of DOP, minimum level of DOP+10% of the amplitude] represents less than 30% of said differential optical path (DOP) over said pupil, for example at least 20%, for example at least 10%, for example at least 5%; with the amplitude the maximum level of said differential optical path (DOP) over said pupil.

Preferably such measurements are realized on an uncoated optical lens. Although not necessarily limited to uncoated optical lens, such measurement appears more accurate on an uncoated optical lens. However, one may measure a coated optical lens and using a transfer function determine what the measurements would be if not the optical lens was not coated. An example of such transfer function is discussed in WO2020/079105.

Advantageously, having contiguous optical elements helps improving the aesthetic of the lens element and is easier to manufacture.

At least over the pupil 16, for example over all the surface of the optical lens, each optical each of the contiguous optical element verifies that $$d = \frac{K}{\sqrt{|P|}},$$

with d a characteristic dimension of the contour of said optical element in mm,

|P| the absolute value of a characteristic optical power of said optical element expressed in diopter, and K a number greater or equal to 0.9, for example greater than 1.2 and smaller than or equal to 1.7, for example smaller than 1.4.

The characteristic dimension d of the contour of each optical element may correspond to a specific size of each optical element.

To define the characteristic dimension d of each optical element, one may use the differential optical path DOP determined as described previously.

The characteristic dimension of each optical element corresponds to the largest diameter of the inscribed circle in a contour plot defined by a level of said differential optical path (DOP), said level being constant over said pupil and within the range [minimum level of DOP, minimum level of DOP+10% of the amplitude], with the amplitude the maximum level of said differential optical path (DOP) over said pupil.

In particular, the optical elements may have a contour shape being inscribable in a circle having a diameter greater than or equal to 0.2 mm, for example greater than or equal to 0.4, for example greater than or equal to 0.6, and smaller than or equal to 2.0 mm, for example smaller than 1.0 mm.

The characteristic optical power of the optical element may be the spherical optical power if the optical element is spherical, or the best spherical optical power if the optical element is not spherical. For example, in the case of an aspherical optical element, the characteristic optical power is the average power of the aspherical optical function of the optical element.

According to an embodiment of the disclosure, least part of, for example all of, the optical elements have a characteristic optical power smaller than or equal to 20 D, for example smaller than or equal to 10 D, for example smaller than or equal to 6 D.

According to embodiments of the disclosure, at least part, for example all of the optical elements have a constant optical power and a discontinuous first derivative between two contiguous optical elements.

Alternatively, at least part, for example all, of the optical elements have a varying optical power and a power sign change between two contiguous optical elements.

The optical function, in particular the dioptric function, of each optical element may be optimized so as to provide a focus image, in particular in peripheral vision, at a constant distance of the retina of the eye of the wearer. Such optimization requires adapting the dioptric function of each of the optical element depending on their position on the lens element.

In particular, the inventors have determined that the spot diagram of the beam of light passing through a spherical 3D shaped micro lens analyzed in peripheral vision (30° from the pupil center) is not a point.

To obtain a point, the inventors have determined that the optical element should have a cylindrical power, for example have a toric shape.

According to an embodiment of the disclosure, at least one, for example all, of the optical element has a non-spherical optical function in standard wearing conditions.

According to another embodiment of the disclosure, at least one, for example all, of the optical elements has a cylindrical power.

According to an embodiment of the disclosure, the optical elements are configured so that at least along one section of the lens the mean sphere of the optical elements varies from a point of said section towards the periphery of said section.

The optical elements may further be configured so that at least along one section of the lens, for example at least the same section as the one along which the mean sphere of the optical elements varies, the cylinder varies from a point of said section, for example the same point as for the mean sphere, towards the peripheral part of said section.

Advantageously, having optical elements configured so that along at least one section of the lens the mean sphere and/or mean cylinder of optical elements varies from a point of said section towards the peripheral part of said section allows varying the defocus of the light rays in front the retina in case of myopia or behind the retina in case of hyperopia.

In other words, the inventors have observed that having optical elements configured so that along at least one section of the lens the mean sphere of optical elements varies from a point of said section towards the peripheral part of said section helps slow down the progression of abnormal refraction of the eye such as myopia or hyperopia.

The optical elements may be configured so that along the at least one section of the lens the mean sphere and/or the cylinder of optical elements varies from the center of said section towards the peripheral part of said section, for example increases then decreases, for example decreases, for example increases.

According to an embodiment of the disclosure, the optical elements are configured so that in standard wearing condition the at least one section is a horizontal section.

The optical lens may comprise an optical center and the optical elements may be configured so that along any section passing through the optical center of the lens, the mean sphere and/or the cylinder of the optical elements varies, for example increases, from the optical center towards the peripheral part of the lens.

The optical lens may comprise a far vision reference point, a near vision reference, and a meridian joining the far and near vision reference points. In such embodiment, the optical elements may be configured so that in standard wearing conditions along any horizontal section of the lens the mean sphere and/or the cylinder of the optical elements varies, for example increases, from the intersection of said horizontal section with the meridian towards the peripheral part of the lens.

Preferably, according to such embodiment, the optical elements are configured so that in standard wearing conditions along any horizontal section of the lens the mean sphere and/or the cylinder of the optical elements varies, for example increases, from the intersection of said horizontal section with the meridian line towards the peripheral part of the lens.

The meridian line corresponds to the locus of the intersection of the main gaze direction with the surface of the lens.

The mean sphere and/or the cylinder varying function, for example increase function, along the sections may be different depending on the position of said section along the meridian.

In particular, the mean sphere and/or the cylinder varying function, for example increase function, along the sections may be unsymmetrical. For example, the mean sphere and/or the cylinder increase function are unsymmetrical along vertical and/or horizontal section in standard wearing conditions.

The mean sphere and/or the cylinder may increase according to an increase function along the at least one horizontal section, the increase function being a Gaussian function. The Gaussian function may be different between the nasal and temporal part of the lens so as to take into account the dissymmetry of the retina of the person.

Alternatively, the mean sphere and/or the cylinder may vary according to an increase function along the at least one horizontal section, the increase function being a Quadratic function. The Quadratic function may be different between the nasal and temporal part of the lens so as to take into account the dissymmetry of the retina of the person.

According to an embodiment of the disclosure, the mean sphere and/or the cylinder of optical elements varies, for example increases, from a first point of said section towards the peripheral part of said section and varies, for example decreases, from a second point of said section towards the peripheral part of said section, the second point being closer to the peripheral part of said section than the first point.

Such embodiment is illustrated in table 1 that provides the mean sphere of optical elements according to their radial distance to the optical center of the lens element.

For example, the optical elements may be regularly distributed along circles centered on the optical center of the optical lens.

The optical elements on the circle of diameter 10 mm and centered on the optical center of the optical lens may be micro lenses having a mean sphere of 2.75 D.

The optical elements on the circle of diameter 20 mm and centered on the optical center of the refraction area may be micro lenses having a mean sphere of 4.75 D.

The optical elements on the circle of diameter 30 mm and centered on the optical center of the refraction area may be micro lenses having a mean sphere of 5.5 D.

The optical elements on the circle of diameter 40 mm and centered on the optical center of the refraction area may be micro lenses having a mean sphere of 5.75 D.

The cylinder of the different optical elements may be adjusted based on the shape of the retina of the person.

According to an embodiment of the disclosure the optical elements are transparent, preferably at least 50%, for example at least 80%, for example at least 95%, for example all of the optical elements are transparent.

Advantageously, the optical elements are not visible on the lens element and do not affect the aesthetics of the lens element.

The optical element may cover specific zones of the lens element, like at the center or any other area.

The optical elements may be disposed on the entire surface of the lens element.

The optical element density or the optical power of each optical element may be adjusted depending on zones of the lens element. Typically, the optical element density or optical may be adjusted such that it improve the effect of the optical element on myopia control, so as to compensate peripheral defocus due to the peripheral shape of the retina for example.

According to an embodiment of the disclosure, at least one, for example all, of the optical elements has a shape configured so as to create a caustic in front of the retina of the eye of the person. In other words, such optical element is configured so that every section plane where the light flux is concentrated if any, is located in front of the retina of the eye of the person.

According to an embodiment of the disclosure, the at least one, for example all, of the optical element having a non-spherical optical function is a multifocal microlens.

In the sense of the disclosure, a "multifocal microlens" includes bifocals (with two focal powers), trifocals (with three focal powers), with continuously varying focal power, rotationally symmetric continuously varying surfacic power around said axis, for example microlens rotationally symmetrical, for example an aspherical shape.

According to an embodiment of the disclosure, at least one of the optical elements, preferably more than 50%, more preferably more than 80% of the optical elements are aspherical microlenses. In the sense of the disclosure, aspherical microlenses have a continuous power evolution over their surface.

An aspherical microlens may have an asphericity comprised between 0.1D and 10D. The asphericity of an aspherical microlens corresponds to the difference of optical power measured at a first point of the optical element and the optical power measured at a second point of the microlens element, the first and second points being disposed at different radial distance from the geometric center of the optical element.

The geometric center corresponds to the center of the largest the inscribed circle in a contour plot defined by a level of said differential optical path (DOP), said level being constant over said pupil and within the range [minimum level of DOP, minimum level of DOP+10% of the amplitude], with the amplitude the maximum level of said differential optical path (DOP) over said pupil.

According to an embodiment of the disclosure, the aspherical microlenses have an optical power at the first point comprised between 2.0D and 7.0D in absolute value, and an optical power at the second point comprised between 1.5D and 6.0D in absolute value.

The asphericity of the aspherical microlenses before the coating of the surface of the lens element on which the optical elements are disposed may vary according to the radial distance from the optical center of said lens element.

Additionally, the asphericity of the aspherical microlenses after the coating of the surface of the lens element on which the optical elements are disposed may further vary according to the radial distance from the geometrical center of said lens element.

According to an embodiment of the disclosure, the at least one multifocal refractive micro-lens has a toric surface. A toric surface is a surface of revolution that can be created by rotating a circle or arc about an axis of revolution (eventually positioned at infinity) that does not pass through its center of curvature.

Toric surface lenses have two different radial profiles at right angles to each other, therefore producing two different focal powers.

Tonic and spheric surface components of toric lenses produce an astigmatic light beam, as opposed to a single point focus.

According to an embodiment of the disclosure, the at least one of the optical elements having a non-spherical optical function, for example all, of the optical elements is a toric refractive micro-lens. For example, a toric refractive micro-lens with a sphere power value greater than or equal to 0 diopter ($\delta$) and smaller than or equal to +5 diopters ($\delta$), and cylinder power value greater than or equal to 0.25 Diopter ($\delta$).

As a specific embodiment, the toric refractive microlens may be a pure cylinder, meaning that minimum meridian power is zero, while maximum meridian power is strictly positive, for instance less than 5 Diopters.

The optical elements and/or optical lens may be made using different technologies like direct surfacing, molding, casting or injection, embossing, filming, or photolithography etc. . . . .

The disclosure further relates to a molding element adapted for molding an optical lens according to the present disclosure.

For example, the disclosure relates to a molding element for a lens element comprising a plurality of contiguous optical elements, comprising a main surface having a curvature and comprising a plurality contiguous surfacic elements, each surfacic element having a curvature that differs from the curvature of the main surface, wherein over at least a 4 mm diameter disc:

the contiguous surfacic elements cover most of the main surface, and each of the contiguous surfacic elements verifies that $$ d = \frac{L}{\sqrt{|C|}}, $$

with d a characteristic dimension of the contour of said surfacic element in mm, $|C|$ the absolute value of a characteristic curvature of said surfacic element expressed in diopter, and L a number greater or equal to 1 and smaller than or equal to 7.6.

Such mold allows obtaining an optical lens according to the invention.

The optical power relates to the curvature by P=dn×C with dn the difference in refractive index on both sides of a diopter. Based on such relation to obtain an optical lens according to the disclosure with a K between 0.1 and 0.5 a mold with a L between 1 and 7.6 is required.

Indeed, since d=K/√(|P|)=K/(√dn√(|C|)) so the L is worth K/√dn. With dn=0.05, L should be between 4 and 7.6 and with dn=0.8, L should be between 1 and 1.9.

Figure 8:
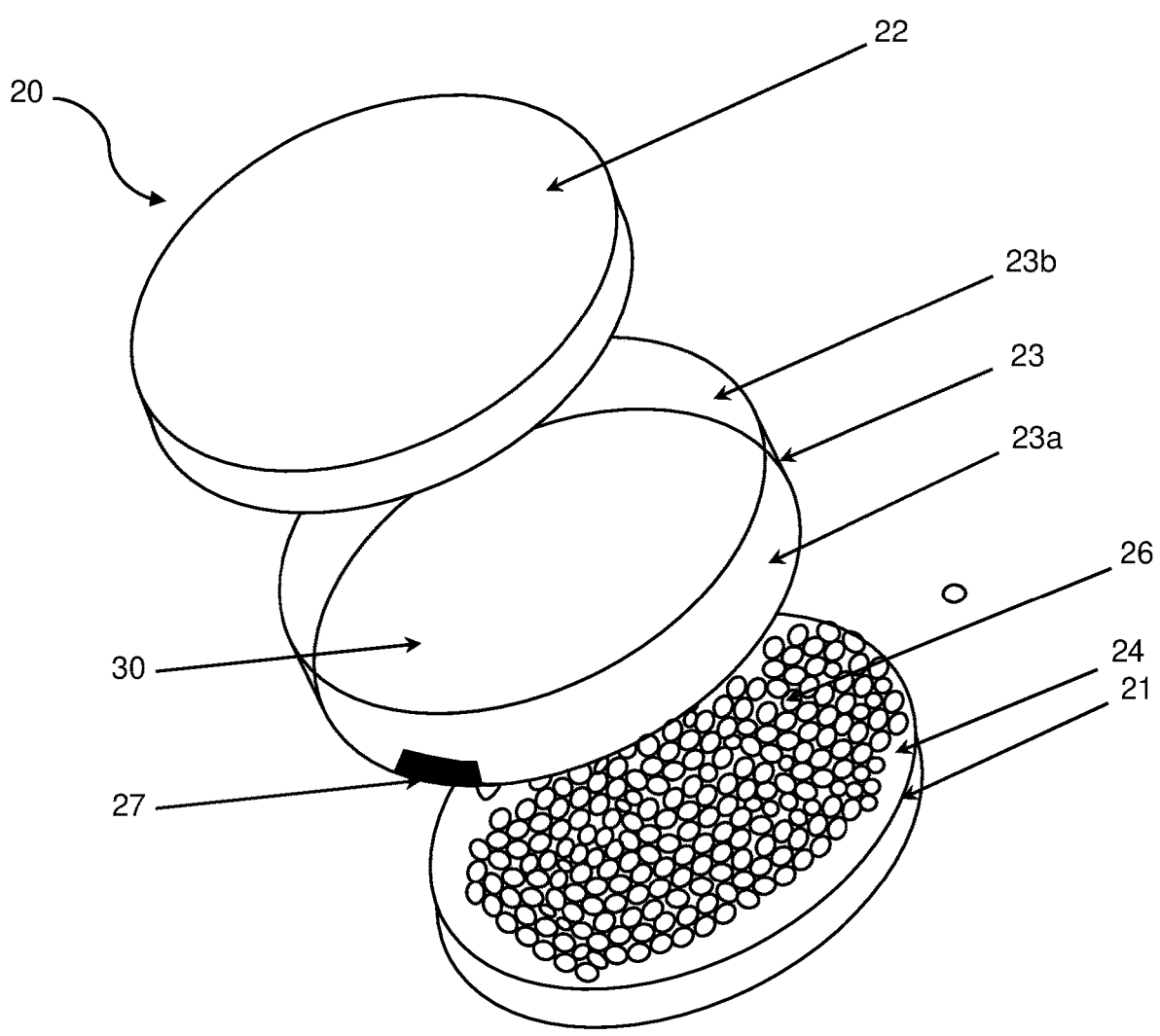
FIG. 8 illustrates an exploded view of a mold for a lens element according to an embodiment of the disclosure.

As illustrated in FIG. 8, a mold 20 for an optical lens according to the present disclosure may comprise a first molding element 21, a second molding element 22 and a gasket 23.

The first molding element 21 has a first surface 24 having a first surfacic curvature. For example, the first surface 24 has a spherical surfacic curvature. Alternatively, the first surface 24 may have an aspherical surfacic curvature and/or a cylindrical surfacic curvature and/or a toric surfacic curvature.

The first surface 24 comprises a main surface having a curvature and a plurality contiguous surfacic elements 26, each surfacic element having a curvature that differs from the curvature of the main surface.

For example, the surfacic elements 26 of the first surface 24 of the first molding element 21 may correspond to the optical element of the optical lens to be manufactured.

The surfacic elements 26 may have surfacic features that correspond to all the features disclosed in relation to the optical element of the optical lens according to the present disclosure.

In particular, over at least a 4 mm diameter disc:

the contiguous surfacic elements cover most of the main surface, and each of the contiguous surfacic elements verifies that $$ d = \frac{L}{\sqrt{|C|}}, $$

with d a characteristic dimension of the contour of said surfacic element in mm, $|C|$ the absolute value of a characteristic curvature of said surfacic element expressed in diopter, and L a number greater or equal to 1 and smaller than or equal to 7.6.

According to an embodiment of the disclosure, at least two of the plurality of surfacic elements 26 are contiguous. In the sense of the disclosure two surfacic elements are contiguous if for at least one path linking the two surfacic elements one may not measure along said at least one path the first surfacic curvature of the first surface 24 of the first molding element 21.

At least part, for example all of the plurality of surfacic elements 26 may be positioned on a structured network.

According to an embodiment of the disclosure, the disposition of at least part, for example all of the plurality of surfacic elements 26 on the first surface of the first molding element exhibit symmetry of revolution about an axis, for example centered on the geometrical center of the first surface 24 of the first molding element 21. In other words, at least part of the plurality of surfacic element 16 may be regularly distributed along at least one circle centered on the geometrical center of the first surface 24 of the first molding element 21.

According to an embodiment of the disclosure, at least part, for example all of the plurality of surfacic elements 26 are placed on at least a ring on the first surface 24 of the first molding element 21.

The plurality of surfacic elements may further be organized on concentric rings on the first surface of the first molding element. For example, the plurality of surfacic elements 26 are positioned along a set of 11 concentric rings over the entire first surface 24 of the first molding element 21. The concentric rings of surfacic elements may be centered on the geometrical center of the first surface 24 of the first molding element 21.

The mean surfacic curvature of the plurality of surfacic elements 26 may be identical for all the surfacic elements of the same concentric ring. In particular, the mean surfacic curvatures of the central zone of the surfacic elements 26 of the same concentric ring are identical.

According to other embodiments of the disclosure, the plurality of surfacic elements 26 may be organized on different patterns, such as for example square shaped pattern.

The mold 20 for the optical lens may further comprise a second molding element 22. The second molding element 22 has a second surface 25. In FIG. 3, the second surface 25 of the second molding element 22 is not represented as it faces the first surface 24 of the first molding element.

The mold 20 for the optical lens further comprises a gasket 23. The gasket 23 has an annular form comprising an inner surface 23a and an outer surface 23b. The gasket 23 further comprises an opening 27.

The gasket 23 seals the first and second molding elements 21 and 22 together to form a molding cavity 28. The molding cavity 28 is defined by the first surface 24 comprising the surfacic elements 26 of the first molding element 21, the second surface 25 of the second molding element 22, and the inner surface 23a of the gasket 23.

The molding cavity 28 of the mold 20 for a lens element 2 is filled with a molding material through the opening 27. Despite being represented in the gasket 23, the opening 27 may alternatively be placed on the first molding element or the second molding element.

For example, the molding material may be a casting material poured into the molding cavity through the opening 27 of the gasket 23. The casting material in the molding cavity is further polymerized into a lens material thereby forming the lens element 2.

Alternatively, the molding material may be a thermo-plastic material. The thermo-plastic material which is in a first liquid state at a first temperature is injected into the mold cavity 28 through opening 27. During the cooling process, the thermo-plastic material changes from a first liquid state to a second solid state corresponding to the lens material of lens element 2.

Many further modifications and variations will be apparent to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. An optical lens intended to be worn in front of an eye of a wearer having at least one prescribed refractive power Px, the optical lens comprising:
   two opposite optical faces and a plurality of contiguous optical elements, at least part of the optical elements having an optical function of not focusing an image on a retina of the eye of the wearer so as to slow down progression of abnormal refraction of the eye, wherein:
   over a pupil having at least a 4 mm diameter, one can measure in a plane corresponding to the at least one prescribed refractive power along at least one direction, a Modulation Transfer Function through the optical lens greater than 0.1 between 0 and 20 cyc/deg;
   a majority of light rays passing through the optical lens over said pupil pass through at least one of the plurality of optical elements, and
   each of the contiguous optical elements verifies that $d = K/\sqrt{|P|}$
   with d a characteristic dimension of a contour of said optical element in mm,
   $|P|$ the absolute value of a characteristic optical power of said optical element expressed in diopter, and
   K a number greater or equal to 0.9 and smaller than or equal to 1.7, wherein over the said pupil the optical lens produces a first optical path difference, a best spherical fitting optical lens produces a second optical path difference, a differential optical path map (DOP) being composed as the difference between said first optical path difference and said second optical path difference, the differential optical path being different than zero, and
   wherein over said pupil, a portion of said differential optical path within a range [minimum level of DOP, minimum level of DOP+10% of an amplitude] represents less than 30% of said differential optical path over said pupil, with an amplitude the maximum level of said differential optical path over said pupil.

2. The optical lens according to claim 1, wherein the characteristic dimension of each optical element corresponds to a largest diameter of an inscribed circle in a contour plot defined by a level of said differential optical path, said level being constant over said pupil and within the range [minimum level of DOP, minimum level of DOP+10% of the amplitude], with the amplitude the maximum level of said differential optical path (DOP) over said pupil.

3. The optical lens according to claim 1, wherein at least part of the optical elements have a characteristic optical power whose absolute value is smaller than or equal to 20 D.

4. The optical lens according to claim 1, wherein the pupil of 4 mm of diameter comprises a reference point of the optical lens.

5. The optical lens according claim 1, wherein the optical elements are positioned on a structured mesh being a squared mesh or a hexagonal mesh or a triangle mesh or an octagonal mesh or a random mesh.

6. The optical lens according to claim 1, wherein at least one of the optical elements has an optical function of focusing an image on a position other than the retina in standard wearing conditions.

7. The optical lens according to claim 1, wherein at least one of the optical elements has an optical function of not focusing an image on a position other than the retina in standard wearing conditions.

8. The optical lens according to claim 1, wherein at least 50% of the light rays passing through the optical lens over said pupil pass through at least one of the plurality of optical elements.

9. The optical lens according to claim 1, wherein at least part of the optical elements are located on a front surface of the optical lens.

10. The optical lens according to claim 1, wherein at least part of the optical elements are located on a back surface of the optical lens.

11. The optical lens according to claim 1, wherein at least part of the optical elements are located between front and back surfaces of the optical lens.

12. A molding element adapted for molding an optical lens according to claim 1, the molding element comprising a main surface having a curvature and comprising a plurality contiguous surfacic elements, each surfacic element having a curvature that differs from the curvature of the main surface,
   wherein over at least a 4 mm diameter disc:
   the contiguous surfacic elements cover at least 50% of the main surface, and
   each of the contiguous surfacic elements verifies that $d = L/\sqrt{|C|}$, with
   d a characteristic dimension of a contour of said surfacic element in mm,
   $|C|$ the absolute value of a characteristic curvature of said surfacic element expressed in diopter, and L a number greater or equal to 1 and smaller than or equal
  to 7.6.

\* \* \* \* \*